Nov. 17, 1959     C. W. SPRAGUE     2,913,019
TOOL HOLDER
Filed May 7, 1957
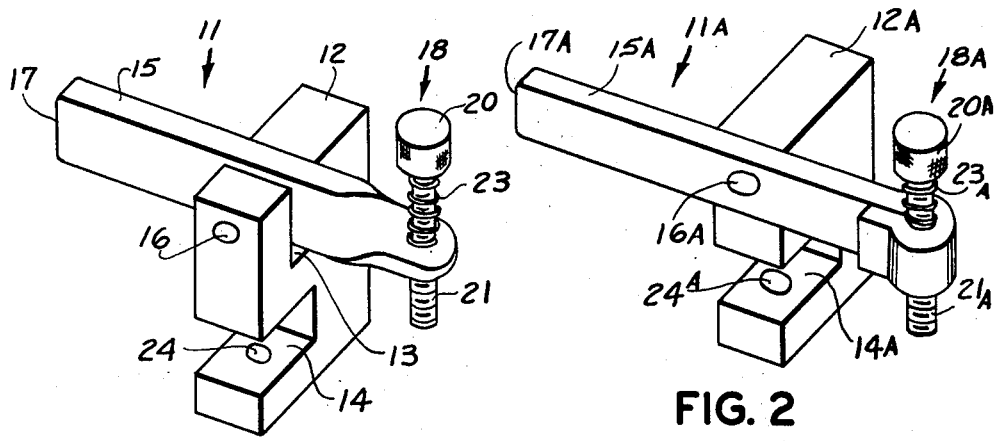
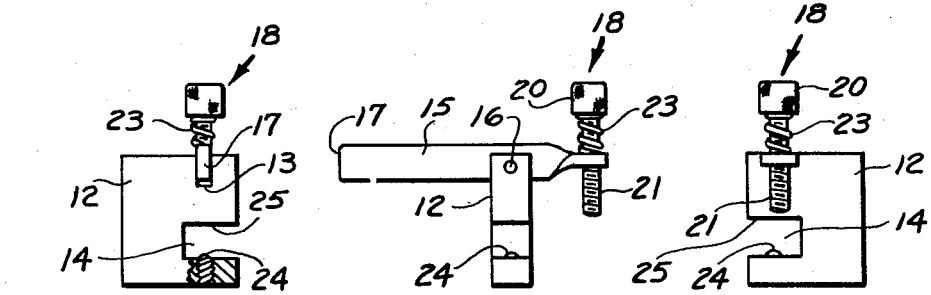
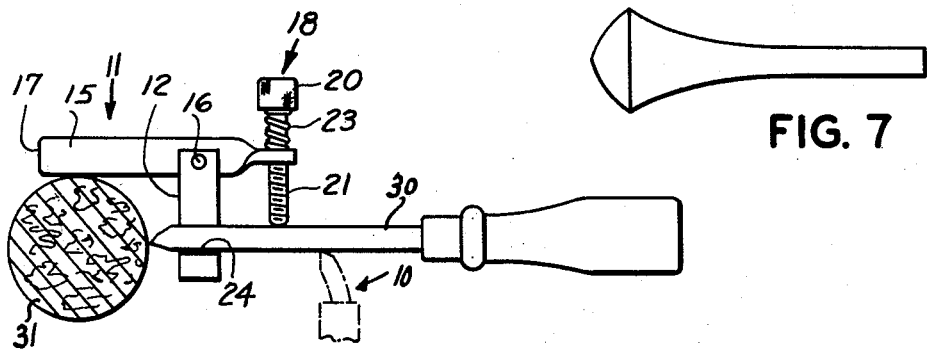
INVENTOR.
CHARLES WILLIAM SPRAGUE
BY
*William Frederick Werner*
ATTORNEY

United States Patent Office 2,913,019
Patented Nov. 17, 1959

2,913,019

TOOL HOLDER

Charles William Sprague, Lincoln, R.I.

Application May 7, 1957, Serial No. 657,571

1 Claim. (Cl. 142—49)

This invention relates to tool holders and more particularly to a tool holder for use with a lathe.

One of the objects of the present invention is to provide a tool holder for a hand tool for use in a lathe.

Another object of the present invention is to provide a tool holder for a hand tool for use in a lathe which acts as a centering gauge and which eliminates biting and gouging of the hand tool into the work piece.

Another object of the present tool holder or steadying device is to provide a tool holder or steadying device for a lathe which prevents the hand tool from springing away from the work piece and which will support the hand tool a proper distance from the center of the work piece.

Other objects of the present invention will become apparent in part and be pointed out in part in the following specification and claim.

The present invention is particularly adaptable to improve the performance of wood turning lathes and the cut-off operations associated therewith and in the performance of such operations as grooving and threading, wherein difficulty is frequently encountered due to the tendency of the hand tool to climb over the work piece producing chatter and rough cutting operations.

Wood working lathes are universally constructed with a bed having a driving head provided with a chuck fixed to one end of the bed and a tail head adjustably positioned along the bed. A hand tool support holder is adjustably secured to the bed between the driving head and tail head. The present invention eliminates this hand tool support for some work and increases the type of work which can be done with the hand tool support acting as a templet.

Similar characters of reference refer to like parts in the accompanying drawings.

Figure 1 is a perspective view of the new and improved tool holder.

Figure 2 is a perspective view of a modified form of tool holder.

Figure 3 is a rear elevational view of Figure 1 with a part broken away for clarity.

Figure 4 is a side elevational view of Figure 1.

Figure 5 is a front elevational view of Figure 1.

Figure 6 is a side elevational view similar to Figure 4 showing the tool holder holding a tool in position against a work piece.

Figure 7 is a side elevational view of a sample form produced by the co-operation of the new tool holder, tool and hand tool support acting as a templet.

Referring to the drawings, reference character 10 designates generally the tool rest of a wood turning lathe, which is not otherwise illustrated, since as will be appreciated, the details of construction of the lathe or other machine tool upon which the present invention is employed form no part of the present invention and may be varied widely.

Reference character 11 generally designates the new and improved tool holder consisting of a block 12 having a vertical slot 13 and a recess or horizontal slot 14. Horizontal slot or recess 14 is located beneath vertical slot 13 and extends to a depth beyond vertical slot 13 so that vertical slot 13 is directly over the recess or horizontal slot 14.

A support arm 15 provided with a screw thread in one end is pivotally mounted in vertical slot 13 by means of a fulcrum pin 16. The length of support arm 15 from fulcrum pin 16 to end 17 and or 17A is determined by the size or diameter of the work piece. A screw generally indicated by reference character 18 consists of a knurled head 20 and a threaded shank 21 which is adapted to engage the screw thread in support arm 15. A coil spring 23 is positioned between knurled head 20 and support arm 15. Coil spring 23 places tension on screw 18 so that it will be firmly held in selected position in support arm 15.

Figure 6 of the drawing shows a wood turning chisel 30 placed in recess or horizontal slot 14. Set screw 24 located in block 12 is adapted to project into recess or horizontal slot 14 so as to hold the hand wood turning chisel 30 or similar tool in recess or horizontal slot 14 by wedging the chisel 30 between set screw 24 and top wall 25 of recess 14.

Figure 1 illustrates support arm 15 as having one end twisted at 90 degrees to provide an area to accommodate screw 18.

Referring to Figure 2 wherein a modified form of tool holder generally designated by reference character 11A is illustrated consisting of a block 12A having a recess or horizontal slot 14A. A support arm 15A provided with a screw thread in one end is pivotally mounted to block 12A by means of a fulcrum pin 16A. Support arm 15A is bent back upon itself to provide a threaded area to accommodate screw 18A. A screw generally indicated by reference character 18A consists of a knurled head 20A and a threaded shank 21A which is adapted to engage the screw thread in support arm 15A. A coil spring 23A is positioned between knurled head 20A and support arm 15A. Coil spring 23A places tension on screw 18A so that it will be firmly held in selected position in support arm 15. A set screw 24A is located in block 12A.

In operation tool holder 11 accommodating a wood turning chisel 30 will be placed upon a work piece 31 with support arm 15 resting upon work piece 31. The point of wood turning chisel 30 will engage work piece 31 in desired position through adjustment of screw 18. The work piece will revolve to permit chisel 30 to perform the desired function. It will be noted that screw 18 performs the function of a gauge to locate the point of the chisel in selected position against the work piece 31.

The present tool holder 11 has particular value when the diameter of work piece 31 is very small. Under normal conditions a wood turning tool point will jump over the work piece when the work piece diameter is small. It will be noted that the support arm 15 of the present tool holder 11 rests on work piece 31 so that the point of chisel 30 is supported by the workpiece. Consequently the chisel 30 cannot jump away from the work piece nor will the chisel chatter or vibrate.

In addition the present tool holder 11 or 11A will permit a freedom of movement of chisel 30 heretofore not obtainable when the tool was compelled to rest on tool rest 10. For example the specimen shown in Figure 7 can be produced by the present tool holder 11 and it cannot be produced either freehand with no tool support or with tool support 10. Once a design is created as illustrated in Figure 7 a templet is made to replace tool rest 10 so that the design can be repeated over and over again.

The difference between tool holder 11 and 11A is a matter of structure, the principle of operation remaining the same. Primarily the tool rest 10 is eliminated giving the operator greater freedom of movement.

It will be apparent that various changes and modifications may be made without departure from the fair and intended scope of the subjoined claim.

What I claim is:

A tool holder and steadying device for wood turning tools comprising in combination, a tool holder consisting of a block having a top, bottom, left side, right side, back and a front, a vertical slot in the top side parallel to the left and right sides, and a horizontal slot in the left side which underlies said vertical slot, a support arm pivotally mounted in said vertical slot overlying the front and back of said block, a first screw adjustably held in one end of said support arm, a set screw located in the bottom of said block and projecting into said horizontal slot to adjustably secure a wood turning tool in said horizontal slot, said first screw adapted to engage a wood turning tool held in said horizontal slot, in operation, said support arm rests upon the work piece being operated upon by the wood turning tool which is adjustably positioned against the work piece through said first screw, said supporting arm overlying and in a plane parallel to the wood turning tool.

References Cited in the file of this patent

UNITED STATES PATENTS

| | | |
|---|---|---|
| 232,634 | Durgin | Sept. 28, 1880 |
| 1,700,409 | Hyrup | Jan. 29, 1929 |
| 2,109,857 | Berkman | Mar. 1, 1938 |
| 2,127,893 | Stromgren | Aug. 23, 1938 |

FOREIGN PATENTS

| | | |
|---|---|---|
| 581,010 | France | Sept. 17, 1924 |